(12) United States Patent
Tiller et al.

(10) Patent No.: US 7,735,988 B2
(45) Date of Patent: Jun. 15, 2010

(54) LOW-GLOSS INK-JET INK

(75) Inventors: Thomas Tiller, Bussigny (CH); Xavier Marguerettaz, Martigny (CH)

(73) Assignee: SICPA Holding S.A., Prilly (CH)

( * ) Notice: Subject to any disclaimer, the term of this patent is extended or adjusted under 35 U.S.C. 154(b) by 0 days.

(21) Appl. No.: 10/578,195

(22) PCT Filed: Nov. 4, 2004

(86) PCT No.: PCT/EP2004/012467

§ 371 (c)(1),
(2), (4) Date: May 4, 2006

(87) PCT Pub. No.: WO2005/049740

PCT Pub. Date: Jun. 2, 2005

(65) Prior Publication Data

US 2007/0165087 A1    Jul. 19, 2007

(30) Foreign Application Priority Data

Nov. 12, 2003   (EP) ................................. 03025903

(51) Int. Cl.
*C09D 11/00*   (2006.01)

(52) U.S. Cl. ..................................... 347/100; 106/31.13

(58) Field of Classification Search ................. 347/100; 106/31.13

See application file for complete search history.

(56) References Cited

U.S. PATENT DOCUMENTS

| | | | | |
|---|---|---|---|---|
| 5,674,923 A | * | 10/1997 | Subbaraman et al. | 523/160 |
| 5,939,468 A | * | 8/1999 | Siddiqui | 523/161 |
| 6,513,921 B1 | | 2/2003 | Houle | |
| 2005/0119368 A1 | * | 6/2005 | Hall-Goulle et al. | 523/160 |

FOREIGN PATENT DOCUMENTS

| | | |
|---|---|---|
| DE | 19725838 | 4/1998 |
| WO | WO 97/10307 | 3/1997 |
| WO | WO03072664 A1 * | 9/2003 |

* cited by examiner

*Primary Examiner*—Steven D Meier
*Assistant Examiner*—Laura E Martin
(74) *Attorney, Agent, or Firm*—Shoemaker and Mattare

(57) ABSTRACT

Non-visible ink jet printing ink composition for marking a substrate, having at least one marking compound absorbing light outside the visible wavelength range of about 400-700 nm, and which contains a hydrocarbon compound, having two to six carbon atoms carrying two or three hydroxyl groups, as a non-particulate matting agent, so as to adapt the gloss of the ink-jet printed marking to the gloss of the substrate.

6 Claims, 2 Drawing Sheets

LOW-GLOSS INK-JET INK

The invention is directed to the use of a non-particulate matting compound in an ink-jet printing ink composition, particularly in an ink composition for security markings which exhibit an identical gloss as the substrate carrying the marking.

There is an increasing need for security markings on transacted goods in order to prevent product diversion and fraud. Security markings are also applied for identification purposes onto a variety of articles including envelopes, checks, stamps, passports, tax stamps, as well as branded or taxed goods.

A number of methods and techniques have been used to identify marked articles, in an effort to reduce counterfeiting and product diversion. In a first type of anti-counterfeiting/anti-diversion measure, an ultraviolet-active (UV-active) ink composition is used to mark the product with identifying indicia. The benefit of using UV-active ink is that the marking is typically not visible when illuminated with light in the visible spectrum (400-700 nm), but becomes visible when illuminated with light in the UV spectrum (200-400 nm). Thus, counterfeiters will be unable to know whether and where the product contains a security marking by merely looking at it under visible light.

Alternative types of security inkjet markings include the use of infrared laser dyes which are poorly absorbing in the visible range of the spectrum of about 400 to 700 nm, but which absorb in the near infrared (NIR) range (750 nm upwards) and can fluorescence in response to the radiation absorption in said NIR range.

Despite the low visible coloration of the above described two types (UV and NIR) of inks, inkjet printings such as barcodes, can still be visualised at non normal viewing angle due to the difference in gloss between the inkjet prints and the substrate. This is principally due to the high gloss of the common binders, which are used in ketone based, fast drying continuous inkjet ink compositions; the said compositions are in fact glossier than most paper or cardboard based commercial substrates. This is a major drawback since it allows an easy visual localisation of the printed information, and criminals involved in counterfeiting and diversion know what they have to look for.

Existing ink formulation techniques to reduce the gloss of prints include the addition of matting agents such as inorganic white pigments or mineral fillers. However, in continuous inkjet printing inks, these types of matting agent are not suitable, because they have a high tendency to settle in the low viscosity medium. Moreover, they often strongly perturb the use of the ink on the printer.

In order to obtain a covert and invisible inkjet security marking for preventing goods from illegal trade, it is essential to reduce the gloss of the inkjet ink and to match it to the substrate's own gloss. Said security marking may furthermore be applied in the form of a code (barcode or two-dimensional data matrix), in order to provide a unique identity to each marked product. Said unique code may furthermore be saved in a data management system, to allow full trace-ability and authentication of the marked product on its way throughout the logistic supply chain, by using appropriate and dedicated scanners for the invisible codes.

In view of the shortcomings stated above, there is a need for improving the formulation of "invisible" marking inkjet inks, in order to make the printings as covert as possible by matching the gloss of the ink-jet printing to the substrate's own gloss. Moreover, the improved formulation is targeted to not contain particulate materials, in order to avoid a blocking of the ink-jet printer nozzles and to reduce down-time of the printing equipment.

This objects of the invention are solved by an ink formulation comprising a non-particulate matting compound according to the features of the independent claim.

DETAILED DESCRIPTION OF THE PREFERRED EMBODIMENTS

Figure 1:
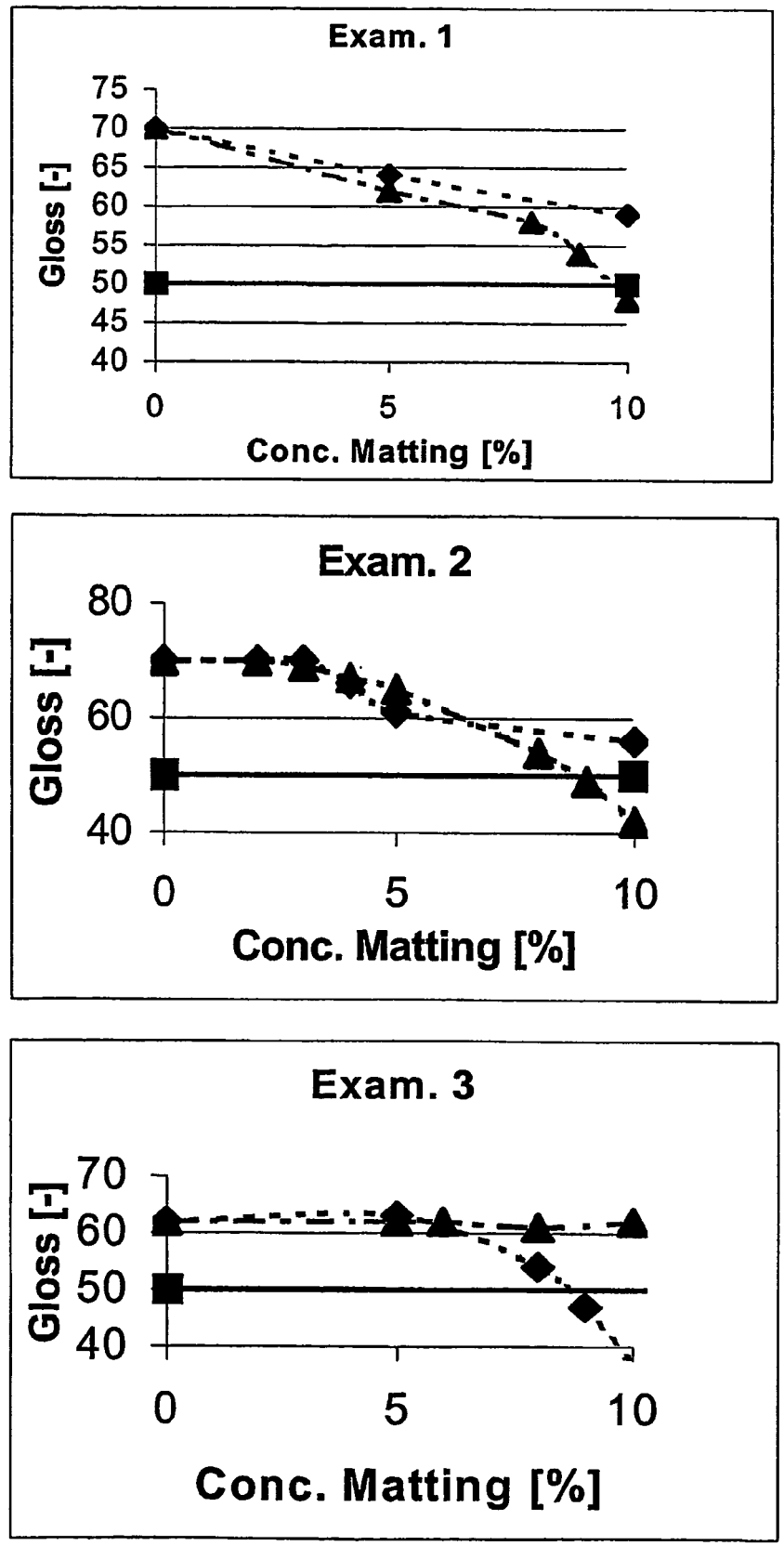
FIG. 1 shows the results of the gloss measurements of inks containing binders as printed Kraft paper.

The use of at least one hydrocarbon compound having two or three hydroxyl groups, said hydrocarbon compound having a carbon chain (linear or branched) of two, three, four five or six carbon atoms in an inkjet printing ink composition as a non-particulate matting compound allows to adapt the gloss of the printed ink composition in such a way that the gloss of the printed marking or indicia is identical to the gloss of the substrate not carrying an imprint. The so obtained marking is not discernible from the substrate with the unaided eye. The non-particulate matting compound is preferably selected from the divalent or trivalent alcohols (diols or triols) of short chain alkyl compounds. In the context of the present invention short chain alkyl compounds include compounds having a chain length of two to six carbon atoms. Preferred divalent or trivalent alcohols suitable as matting compounds include pentanediol, butanediol, ethylenediol, propanediol or glycerol, and their corresponding isomers. As used herein, a matting compound is a compound having a mattifying effect in inkjet printing ink compositions. Typically, the matting compound is incorporated in the ink composition at a concentration level between 0.5 to 10 weight-%, more preferably between 1 to 8 weight-%, of the overall ink composition. In specific formulations, the amount of matting compound may even range from 0.3 to 20 weight-% of the overall ink composition. Upon printing, the main solvent begins to evaporate, leaving on the substrate the binder and the matting compound which has a higher boiling point than the main solvent. As the binder is insoluble in that matting compound, the binder precipitates and forms a non-perfect film which is matt in appearance.

The marking comprises marking compounds which exhibit no absorption of light in the visible area of the electromagnetic spectrum (400 to 700 nm). These compounds may absorb either at shorter wavelengths than 400 nm (UV-) or at longer wavelength than 700 nm (IR-radiation). They may further be luminescent compounds, either of the up- or of the down-converting type, i.e. they may emit radiation either at shorter wavelength or at longer wavelength than the wavelength of the absorbed light.

The inkjet printing ink composition comprises further: at least one solvent, at least one binder, at least one marking compound absorbing light outside the visible range, and optionally further additives.

In the context of the present invention said at least one solvent is selected from fast drying solvents such as ketones, especially acetone and methyl ethyl ketone; acetate- or alcohol based solvents such as ethyl- or methyl-acetate or methanol can also be used. The solvent can also be a mixture of two or more of the mentioned solvents. Preferably, the solvent does not contain water, except the water included in the solvent or in other components of the ink as an impurity. Thus, the ink is preferably free of water. The solvent is present in an amount ranging from 40 to 95 weight-% or more, preferably ranging from 70 to 90 weight-%, of the overall ink composition.

Solvents which have slower evaporation properties than the said solvents, such as isopropanol, isopropyl acetate, ethanol or propanol, can also be included in the solvent composition. Such solvents are, however, only incorporated in minor amounts, in order to fine-tune the overall ink properties.

The binder is selected from the group of vinylic resins, cellulose derivates, polyacetal resins, acrylic resins or styrene-maleic copolymer resins. Preferably, the binders are chosen from vinyl chloride- and vinyl acetate copolymers, nitrocellulose or polyvinyl butyral. The amount of binder incorporated in the ink composition ranges between 3 to 30 weight-%, more preferably between 4 to 20 weight-%, of the overall ink composition.

The marking compound is preferably selected from the group of dyes which do not show absorbance in the visible range of the electromagnetic spectrum, i.e. at wavelengths between 400 to 700 nm, but which are visible on or after exposure to ultraviolet (200 to 400 nm) or infrared (700 to 2500 nm) light. Suitable dyes include UV markers such as optical brightener, rare earth chelates, as well as NIR dyes, such as laser NIR dyes. Typical incorporation levels range from 0.0001 to 10 weight-%, preferably from 0.001 and 5 weight-%, and more preferably from 0.1 to 2 weight-% of the overall ink composition.

Additional additives which may be incorporated into the ink composition include conductivity salts and humectants. Suitable salts to impart conductivity to the ink may be selected from inorganic salts such as $LiNO_3$, organic salts such as alkyl ammonium acetate, and mixed salts such as potassium acetate. The conductivity of the salt should be sufficiently high to reach about 1 mS at 1 weight-% incorporation level. The salt is preferably incorporated in an amount ranging from 0.3 to 5 weight-%, more preferably ranging from 0.5 to 3 weight-%, of the overall ink composition.

The humectant is added to the ink composition in order to prevent nozzle clogging when the highly volatile solvent evaporates. Suitable humectants are e.g. glycols and glycol ester, N-methyl-pyrrolidone (NMP), glycerol esters, long chain alkyl amides, or the like; typically, these compounds to be used as humectant have a higher boiling point than said highly volatile solvents commonly used in inkjet printing ink compositions. The humectant is typically incorporated at levels ranging from 0.2 to 20 weight-%, and more preferably ranging from 0.5 to 5 weight-%, of the overall ink composition.

In a further aspect, the invention discloses a method of applying an invisible security marking to a substrate. The method comprises the steps of:
  Providing an inkjet printing ink comprising at least one hydrocarbon compound having two or three hydroxyl groups, said hydrocarbon compound having a linear or branched carbon chain of two, three, four, five or six carbon atoms, as a non-particulate matting compound; and
  printing a security marking on a substrate;

and is characterised in that the printed security marking exhibits a same level of gloss as the gloss of the substrate. Another aspect of the invention is a substrate carrying a printed marking, which is printed with an inkjet ink according to the invention, and which exhibits a same level of gloss as the substrate.

The invention is now described in more detail by way of examples:

EXAMPLE 1: UCAR VMCH (Vinylic Resin, DOW)
EXAMPLE 2: Scripset 520 (Styrene-Maleic Anhydride Copolymer, Hercules Inc.)
EXAMPLE 3: Pioloform BL 18 (Polyvinylbutyral, Wacker Chemie)
EXAMPLE 4: Nitrocellulose DHX 3/5 (Noble Enterprises)
EXAMPLE 5: Joncryl 671 (Acrylic Resin, S C Johnson & Son)
EXAMPLE 6: Paraloid A-12 (Acrylic Resin, Rohm & Haas)

The inks, which include combinations of matting compound and binder as listed in table 1, further contained 1 weight-% tetrabutyl ammonium tetrafluoroborate (Fluka) as conductive salt, 2 weight-% diproylenglycol monomethyl ether (DPM) (DOW) as humectant and 0.002 weight-% of UVITEX OB (Ciba SC) as UV fluorescing marking compound, and the remaining part of the composition being acetone. The amount of binder added is given also in table 1.

For gloss-testing purposes, 1 ml of ink was then left to evaporate on a tin foil substrate and the matting effect was observed as a whitening of the drying film.

TABLE 1

Combinations of binder and matting compound.

| | Example | | | | | |
|---|---|---|---|---|---|---|
| | 1 | 2 | 3 | 4 | 5 | 6 |
| Amount of binder | 10% | 7% | 11% | 15% | 21% | 13% |
| Glycerol | | >2% | >5% | >5% | >2% | |
| 1,2-butanediol | >2% | >2% | | | | |
| 1,5-pentanediol | >2% | >1% | | | | >2% |
| Monopropylene glycol | >1% | >2% | | >5% | | >2% |
| Dipropylene glycol | >2% | | | | | |

In order to determine the intensity of the matting effect for the various combinations of binder and matting compound, Kbar films of the above inks were printed on various representative substrates, namely Fiduciary (FID) and Kraft paper. The gloss at 60° was then measured as a function of the amount (in weight-%) of matting diol or triol in the ink composition using a LANGE REFO 60 glossmeter.

FIG. 1 shows the results of the gloss measurements of the inks as printed with binder examples 1 to 3 on Kraft paper. The matting compounds were 1,5-pentanediol (triangle) and 1,2-butanediol (diamond) in example 1. The matting compounds were 1,5-pentane-diol (triangle) and monopropyleneglycol (diamond) in example 2. The matting compounds were monopropyleneglycol (triangle) and glycerol (diamond) in example 3. The squares represent the gloss of the substrate. For the vinylic binder an amount of at least 7 weight-% of matting compound is required in order to achieve a significant reduction of the gloss. For styrene maleic anhydride copolymers (Hercules Scripset) less of the matting compound has to be added in comparison to the vinylic binder. Both matting compounds used exhibit a similar reduction of gloss with an increasing amount of matting compound added. A strong decrease of gloss can be observed for a polyvinylbutyral (Pioloform) binder on addition of about 6 weight-% of glycerol. In contrary to this monopropyleneglycol is not suitable for reducing gloss when added to a polyvinylbutyral binder and printed on Kraft paper.

Figure 2:
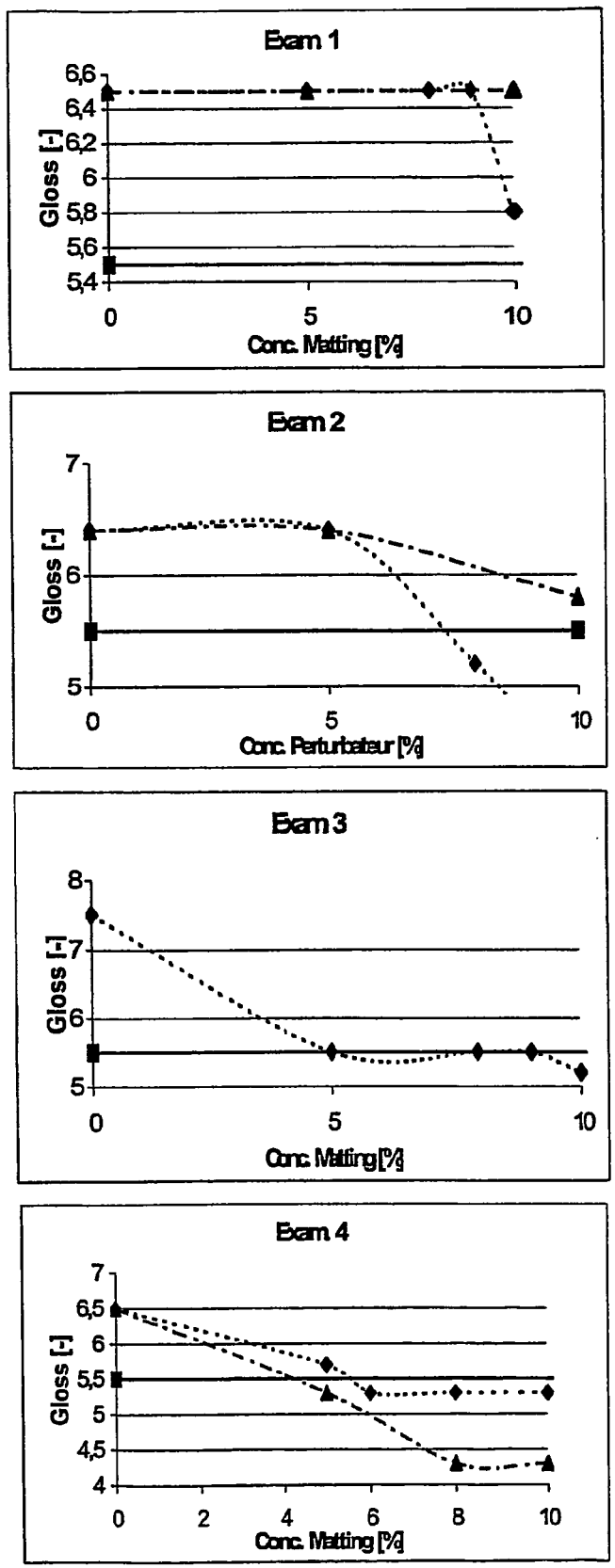
FIG. 2 shows results for gloss measurements of inks containing binders as printed on FID paper.

FIG. 2 shows somewhat different results for the gloss-measurements of the inks printed on FID paper. The ink containing a vinylic resin as binder (example 1) requires a high amount of about 9 weight-% of 1,5-pentane-diol in order to exhibit a clear reduction of gloss. An ink with binder example 2 (styrene-maleic anhydride) requires less matting compound, especially if 1,5-pentanediol is used. Even less matting compound is necessary if polyvinylbutyral (binder example 3) is used. About 4 weight-% of monopropyleneglycol are capable of reducing the gloss of the printed ink to the level of the substrate. Similar amounts of monopropyleneglycol or glycerol are necessary to reduce the gloss of an ink containing a nitrocellulose binder to the level of the substrate.

In a further experiment a selected amount of matting compound was incorporated into inkjet inks and an UW readable two-dimensional code was printed on different substrates, namely Kraft paper, cardboard and FID paper. As the amount of printed ink was too low for reproductively measuring the gloss on those low gloss substrates, the invisibility level of the inkjet print was assessed based on the following criteria:

++=inkjet print is visible as being much more glossy;

+=inkjet print is slightly visible as being more glossy;

0=inkjet print is fully invisible as having same gloss level than the substrate;

− inkjet print is slightly visible as being more matt;

−−=inkjet print is very visible as being much more matt than the substrate.

The results are shown in Table 2.

TABLE 2

Comparison of gloss effects of printed 2D codes.

| | No matting compound | Pentanediol 5% | Propylene glycol 3% | Glycerol 5% |
|---|---|---|---|---|
| Vinylic resin | | | | |
| Kraft Paper | ++ | 0/− | | −− |
| Cardboard | + | 0 | | 0/− |
| FID Paper | + | +/0 | | − |
| Nitrocellulose | | | | |
| Kraft Paper | ++ | 0 | | |
| Cardboard | + | 0 | | |
| FID Paper | +/0 | 0 | | |

TABLE 2-continued

Comparison of gloss effects of printed 2D codes.

| | No matting compound | Pentanediol 5% | Propylene glycol 3% | Glycerol 5% |
|---|---|---|---|---|
| Pioloform BL 18 | | | | |
| Kraft Paper | + | | | 0/− |
| Cardboard | 0 | | | 0 |
| FID Paper | + | | | 0 |

The invention claimed is:

1. Inkjet printing ink composition, comprising
   a. at least one binder in an amount between 4 to 20 wt-% of the overall composition;
   b. at least one non-particulate matting compound in an amount between 1 to 8 wt-% of the overall composition;
   c. at least one fast-drying solvent in an amount from 70 to 90 wt-% of the overall composition; and
   d. at least one marking compound absorbing light outside the visible range in an amount from 0.001 to 5 wt-%;
   wherein the matting compound has a higher boiling point than the fast drying solvent, and wherein the binder is insoluble in the matting compound and is selected from the group of polymers selected from the group consisting of vinyl chloride- and vinyl acetate copolymers, nitrocellulose and polyvinyl butyral.

2. Inkjet printing ink composition according to claim 1, wherein the matting compound is selected from the group consisting of the diols and triols of short chain alkyl compounds having a chain length of two to six carbon atoms, said group consisting of pentanediol, butanediol, ethylenediol, propanediol, glycerol, and their corresponding isomers.

3. Inkjet printing ink composition according to claim 1, wherein the fast-drying solvent is selected from the group of ketones consisting of acetone and methyl ethyl ketone.

4. Inkjet printing ink composition according to claim 1, wherein the ink is free of water.

5. Inkjet printing ink composition according to claim 1, wherein the marking compound is selected from the group of dyes which do not show absorbance in the visible range of the electromagnetic spectrum, said group consisting of UV markers, optical brighteners, rare earth chelates, NIR dyes and laser NIR dyes.

6. Substrate carrying a security marking printed with an inkjet printing ink composition according to claim 1.

* * * * *